350-96.1 SR
XR 3,546,438 SH
SEARCH ROOM

[11] 3,546,438

[72] Inventors George L. Buc
Fairfax;
David N. Michael, Alexandria, Virginia
[21] Appl. No. 641,340
[22] Filed May 25, 1967
[45] Patented Dec. 8, 1970
[73] Assignee Farrington Electronics Inc.
Springfield, Va.
a corporation of Massachusetts

[54] ILLUMINATION SYSTEM

3 Claims, 3 Drawing Figs.

[52] U.S. Cl. 235/61.11, 240/1; 350/96
[51] Int. Cl. F21v 7/08, G02b 5/14; G06k 7/10
[50] Field of Search 235/61.11, 61.115; 350/96(X); 240/1(E), 1(X); 40/140; 331/94.5

[56] References Cited
UNITED STATES PATENTS

| | | | |
|---|---|---|---|
| 2,297,851 | 10/1942 | Wyss | 350/96 |
| 3,248,554 | 4/1966 | WuChen | 250/219(IDC)UX |

*Primary Examiner*—Maynard R. Wilbur
*Assistant Examiner*—Thomas J. Sloyan
*Attorney*—Gerald J. Ferguson, Jr.

ABSTRACT: Optical apparatus for illuminating items of information represented by the presence or absence of data in the form of characters, marks or holes arranged on documents, comprising a light guide, a light source partially enclosed by a reflector for directing light rays emitted from the light source in one general direction and through the light guide, a section of the reflector characterized by an elliptical configuration, whereby the light source is positioned at one focal center of the ellipse and an end of the light guide is positioned at the remaining and second focal center of the ellipse.

3546438
OR IN 235/61.11E

PATENTED DEC 8 1970

3,546,438

Inventor
GEORGE L. BUC
DAVID N. MICHAEL

By Jacob Frank Attorney

ILLUMINATION SYSTEM

BACKGROUND OF THE INVENTION

The present invention relates to the field of illumination systems, and more particularly it relates to an improved light station for photoelectric document readers. Various types of photoelectric readers are presently in use. One type of photoelectric reader is designed to read punched data bearing documents having a light source positioned at one side of a path traveled by a punched document and a light responsive member stationed directly at the opposite side thereof, whereby light emitted from the light source is detected by a light responsive member through a hole in the punched document transported therebetween. In other types of photoelectric readers, use is made of the light reflected from a data bearing document, the light source and light responsive member being positioned at the same side of a path traveled by the document, whereby information on the data bearing document is photoelectrically determined from the difference in reflected light between areas of the data bearing document where information is absent.

In many instances, with the types of photoelectric readers described above, the illumination function may have to be carried out in limited space. Further, the heat generated by the light source may prove to be damaging should the light source be placed too immediate to the path of travel by the document. In addition, it is desirable that members such as the feed, transport or detection devices, should be sufficiently isolated from other operations to minimize the possibility of interference that could be detrimental to the overall operation of the system. At the same time, it is important that an acceptable level of light intensity be provided at the document area by the illumination system to allow for optimum performance of the photoelectric reader.

From the above, it may be seen that it is desirable to position the light source at a suitable distance from the path traveled by the document and utilize a guide arrangement to carry the light rays emitted therefrom to an area closely spaced from the document path. Present devices do exist for accomplishing this function, however, the present invention in addition to the above provides an inexpensive illumination system improved in efficiency and adaptability over the prior art. To attain this, the present invention contemplates making efficient use of the light rays emitted from the light source and producing a zone of light on a document of relatively high uniform intensity despite the fact the light source is sufficiently spaced thereon.

SUMMARY OF THE INVENTION

Briefly stated, a preferred embodiment of the improved illumination system for photoelectric document readers in the present invention is incorporated in a portion of an elongated elliptical reflector having an elongated light source positioned at the focal center of the elliptical reflectors closest to the reflector, the light rays therefrom being focused in a general direction at the second focal line of the elliptical reflector whereat is positioned an end of a transparent light guide which transmits the light rays to a plane to be traversed by an information bearing document producing thereat a zone of light of relatively high uniform intensity for reading the document.

For the purpose of illustration, a typical embodiment of the invention is shown in the accompanying drawings in which:

DETAILED DESCRIPTION OF A PREFERRED EMBODIMENT OF THE INVENTION

Figures 1, 2, 3:
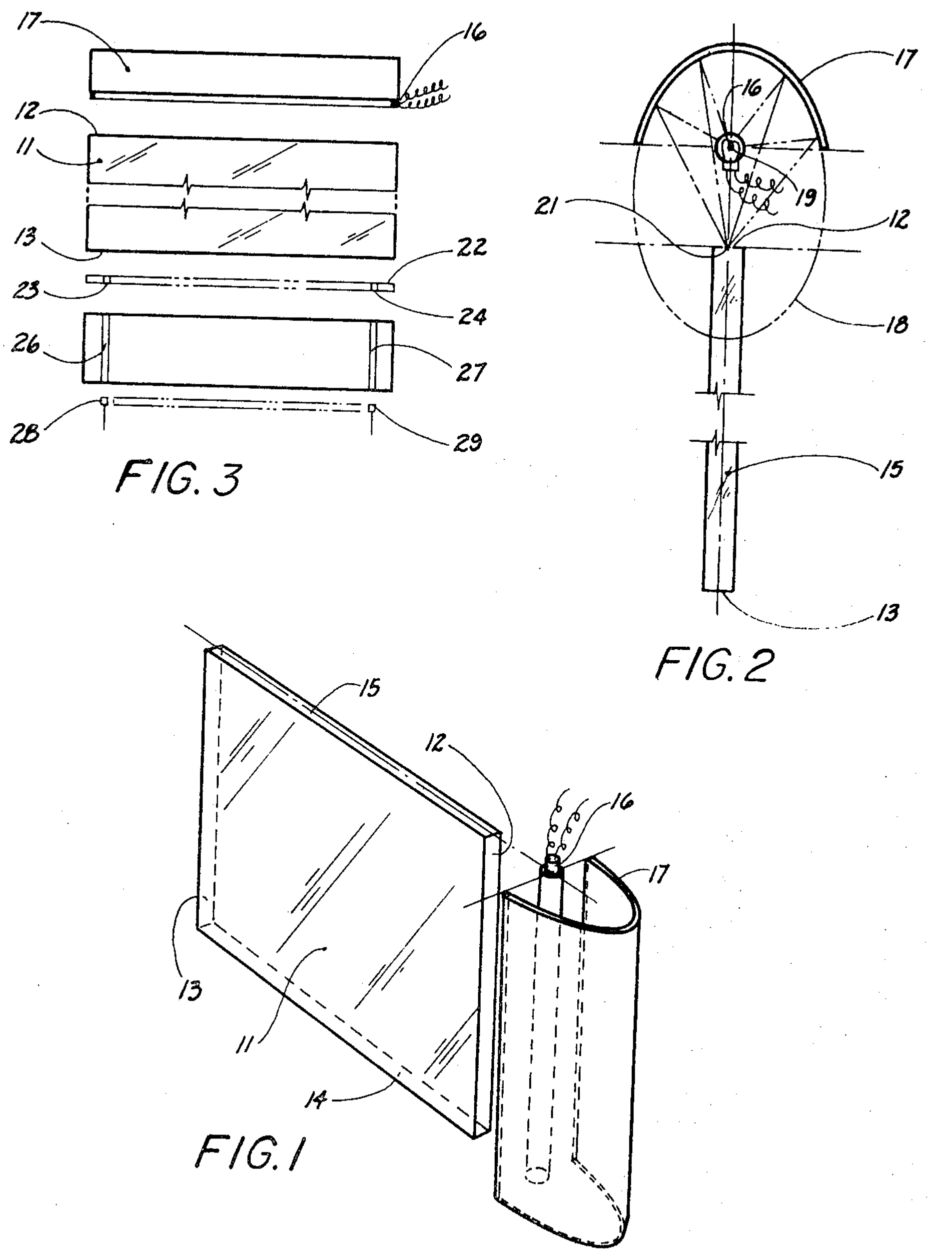
FIG. 1 is a perspective view of the illumination system of the present invention.
FIG. 2 is a plan view of the apparatus shown in FIG. 1.
FIG. 3 is a side view of the apparatus shown in FIG. 1, additionally incorporating a photoelectric responsive assembly which might be utilized to read a document passing between the latter assembly and the illumination system.

Referring to FIG. 1 there is shown a solid rectangular shaped light guide 11 of transparent material such as glass, plastic or the like, bounded by edges 12, 13, 14 and 15 having parallel opposing edge pairs 12, 13 and 14, 15. Opposite edge 12 of light guide 11, is an elongated lamp 16 having a tungsten filament extending the length thereof. About the lamp is an elongated, curved reflector 17.

As may be more readily observed from FIG. 2, a plain view of the invention shows that a horizontal section of reflector 17 form a portion of an ellipse, the remainder of the ellipse being traced out in dashed lines 18. Reflector 17 as a whole appears as a vertical slice of a tubular member, whereby a plurality of horizontal planes along the vertical dimension of the reflector each defines uniform segmental configuration of an ellipse.

An ellipse is a plane curve the path of a point the sum of whose distances from the two fixed points (the foci) is constant, and it has been observed that in an ellipse, all the light that will emanate from one focus and be reflected by the ellipse, passes through the second focus. In furtherance of the above, elongated lamp 16 is positioned in the line with a vertical axis 19 each point of which represents a first focus of elliptical reflector 17 and side 12 of light guide is similarly positioned in line with a vertical axis 21 each point of which represents a second focus of elliptical reflector 17.

In referring to FIG. 3, there is shown a side view of the illumination device illustrated in FIG. 1 and 2, and there is also illustrated a data bearing document in the form of a punched card 22 having holes 23 and 24, shown to travel between the illumination apparatus and a photoelectric detector 25. The detector has a number of tubular passages 26, 27 arranged in a column to be in alignment with the corresponding possible hole positions across the height of punched card. At the rear of each tubular passage is a corresponding light sensitive member 28, 29.

In operation of the illumination system, the long straight filament lamp is so positioned relative to the elongated elliptical reflector 17 partially surrounding the lamps, that an image of the filament is focused from parallel and inclined angles onto end 12 of a thin transparent plate defining light guide 11 which carries forward the beams of light rays by total internal reflection to produce a narrow vertical zone of uniform high intensity light output at edge 13 of the light guide, thereby illuminating a document for photoelectric pickup of information positioned thereon in the form of holes, marks, characters etc. The uniform high intensity light output is obtained by the positioning of light guide edge 12 at the axis 21. As punched card 22 travels between the light guide edge 13 and detector 25, each hole position in a column opposite light guide edge 13 will allow to pass rays of light which by the way of the aligned tubular passages will activate a light sensitive member denoting where a hole position is present in a selected column on the punched card.

Attention is directed to the fact that, even though the long straight filament itself may not be uniform in the emission of light, due to the combination of the particular positioning arrangement shown and the mixing of light in the light guide by total internal reflection a uniform illumination zone of high intensity light will be present at output edge 13 of light guide 11.

A significant feature of the present invention, is since light is captured at one end of light guide 11, variations of the length of the light guide will not, within reasonable limits, detrimentally effect the light intensity at output edge 13, therefore, the light guide length is not critical and may be varied in length to conform with the design requirement of a machine with which it is to be utilized.

Finally, it should be noted that though the word light has been used throughout this should not be taken as limiting the invention to radiant energy having frequencies in the visible portion of the spectrum.

It should be understood, of course, that the foregoing disclosure relates to what is presently considered to be the best made and preferred embodiment of the invention and that modifications or alterations may be made therein without departing from the spirit and the scope of the invention, it is desired, therefore, that only limitations be placed on the invention as are imposed by the prior art and as set forth in the appended claims.

We claim:

1. In a photoelectric reading station for reading a document bearing data arranged in selected ones of a plurality of predetermined locations, a system for providing a zone of light adapted to cover a document area containing a plurality of said predetermined locations on a document comprising:

said document;

light sensitive reading means responsive to light from said document area;

an elliptical cylindrical reflector having in one direction uniform cross section configurations each forming a segment of an ellipse;

an elongated lamp coincident with and disposed along the axis defining a first focal line of the ellipse nearest the reflector;

a light transparent solid having a pair of planes bounded at least by first, second, third, and fourth surfaces;

said first surface coincident with and disposed along the axis of symmetry defining a second focal line parallel with the first focal line of the ellipse, the light from said elongated lamp being focused along said first surface and channelled through said light transparent solid by total internal reflection to said second surface; and said second surface adapted to emit a narrow zone of high intensity light directed at said area, said second surface being at a distance from said light source which is more than the distance between said first and second focal lines.

2. The apparatus defined in claim 1 where the first and second surfaces form opposing parallel sides of the transparent solid.

3. The apparatus defined in claim 1 wherein the third and fourth surfaces form opposing parallel sides of the transparent solid.